United States Patent
Pelly et al.

(10) Patent No.: US 7,206,430 B2
(45) Date of Patent: Apr. 17, 2007

(54) DATA PROCESSING APPARATUS AND METHOD OF PROCESSING DATA

(75) Inventors: Jason Charles Pelly, Reading (GB); Daniel Warren Tapson, Basingstoke (GB)

(73) Assignee: Sony United Kingdom Limited, Weybridge (GB)

(*) Notice: Subject to any disclaimer, the term of this patent is extended or adjusted under 35 U.S.C. 154(b) by 728 days.

(21) Appl. No.: 10/317,736

(22) Filed: Dec. 12, 2002

(65) Prior Publication Data

US 2003/0135736 A1    Jul. 17, 2003

(30) Foreign Application Priority Data

Dec. 13, 2001   (GB) ................... 0129907.2

(51) Int. Cl.
- G06K 9/00   (2006.01)
- G06K 9/32   (2006.01)
- G06K 9/36   (2006.01)
- G06K 9/46   (2006.01)
- H04L 9/00   (2006.01)

(52) U.S. Cl. .............. 382/100; 382/250; 382/294; 380/44; 713/176

(58) Field of Classification Search ............ 382/100, 382/250, 294–299; 380/44–47, 277–282; 713/176

See application file for complete search history.

(56) References Cited

U.S. PATENT DOCUMENTS 5,664,018 A * 9/1997 Leighton .................. 380/54

(Continued)

FOREIGN PATENT DOCUMENTS

WO    WO 98/03014    1/1998

(Continued)

OTHER PUBLICATIONS

Cox, I.J.; Kilian, J.; Leighton, F.T.; Shamoon, T., Secure Spread Spectrum Watermarking for Multimedia, Dec. 1997, Image Processing, IEEE Transactions on, vol. 6, Issue 12, pp. 1673-1687.*

(Continued)

*Primary Examiner*—Andrew W. Johns
*Assistant Examiner*—Anthony Mackowey
(74) *Attorney, Agent, or Firm*—Oblon, Spivak, McClelland, Maier & Neustadt, P.C.

(57) ABSTRACT

A watermarking system comprises an encoding data processor operable to generate at least one marked version of an original item of material by introducing one of a predetermined set of code words into a copy of the original material item. The code words are generated from a pseudo-random number generator initialised with a seed value. The seed value is used to identify the marked material item, from the code word produced from the seed value. The watermarking system also includes a detecting data processor operable to identify a particular marked copy of the material item by recovering a code word from the marked material item and correlating all code words in the set of code words with the recovered code word. The detecting data processing apparatus also includes a registration processor operable to associate samples of the original material item with corresponding samples of the marked material item to which corresponding code word coefficients may have been added. By registering the original material item with the marked material item, a likelihood of correctly identifying the version of the marked material item is improved, reducing a false negative detection probability.

18 Claims, 5 Drawing Sheets

U.S. PATENT DOCUMENTS

| | | | |
|---|---|---|---|
| 5,721,788 A * | 2/1998 | Powell et al. | 382/100 |
| 5,930,369 A * | 7/1999 | Cox et al. | 380/54 |
| 6,084,989 A | 7/2000 | Eppler | |
| 6,101,602 A * | 8/2000 | Fridrich | 713/176 |
| 6,104,826 A * | 8/2000 | Nakagawa et al. | 382/100 |
| 6,278,792 B1 | 8/2001 | Cox et al. | |
| 6,671,407 B1 * | 12/2003 | Venkatesan et al. | 382/232 |
| 6,683,957 B1 * | 1/2004 | Shin | 380/54 |
| 6,823,455 B1 * | 11/2004 | Macy et al. | 713/176 |
| 6,975,745 B2 * | 12/2005 | Bradley | 382/100 |
| 7,051,203 B1 * | 5/2006 | Smith | 713/168 |
| 2002/0037091 A1 * | 3/2002 | Terasaki | 382/100 |
| 2003/0039376 A1 * | 2/2003 | Stach | 382/100 |
| 2003/0099355 A1 * | 5/2003 | Moroney | 380/210 |
| 2005/0044519 A1 * | 2/2005 | Sengupta et al. | 716/11 |

FOREIGN PATENT DOCUMENTS

| | | |
|---|---|---|
| WO | WO 00/33282 | 6/2000 |
| WO | WO 01/91461 | 11/2001 |

OTHER PUBLICATIONS

Wang, Q.; Shenghe, S., DCT-Based Image-Independent Digital Watermarking, Aug. 21-25, 2000, Signal Processing Proceedings, 2000. WCCC-ICSP 2000, 5th International Conference on, vol. 2, pp. 942-945.*

Haitsma J et al: "A watermarking scheme for digital cinema"; Proceedings 2001 International Conference on Image Processing. ICIP 2001. Thessaloniki, Greece, Oct. 7-10, 2001, Intenational Conference on Image Processing, New York, NY: IEEE, US, vol. 1 of 3. Conf. 8, Oct. 7, 2001, pp. 487-489, XP010563804 ISBN: 0-7803-6725-1.

Delannay D et al: "Compensation of geometrical deformations for watermark extraction in the digital cinema application"; Proceedings of the SPIE, SPIE, Bellingham, VA, US, vol. 4314, Jan. 22, 2001, pp. 149-157, XP002960804 ISSN:0277-786X.

Kutter M: "Watermarking Resisting to Translation, Rotation and Scaling"; Proceedings of the SPIE, SPIE, Bellingham, VA, US, vol. 3528, 1999, pp. 423-431, XP000978280 ISSN: 0277-786X.

* cited by examiner

DATA PROCESSING APPARATUS AND METHOD OF PROCESSING DATA

FIELD OF INVENTION

The present invention relates to encoding data processing apparatus and methods, which are arranged to embed code words into versions of material items. In some applications the code words are used to uniquely identify the material items.

Correspondingly, the present invention also relates to data processing apparatus and methods operable to detect one or more code words, which may be present in a material item.

BACKGROUND OF THE INVENTION

A process in which information is embedded in material for the purpose of identifying the material is referred to as watermarking.

Identification code words are applied to versions of material items for the purpose of identifying the version of the material item. Watermarking can provide, therefore, a facility for identifying a recipient of a particular version of the material. As such, if the material is copied or used in a way, which is inconsistent with the wishes of the distributor of the material, the distributor can identify the material version from the identification code word and take appropriate action.

In this description, an item of material, which is copied or used in a way, which is inconsistent with the wishes of the originator, owner, creator or distributor of the material, will be referred to for convenience as an offending item of material or offending material.

The material could be any of video, audio, audio/video material, software programs, digital documents or any type of information bearing material.

For a watermarking scheme to be successful, it should be as difficult as possible for the users to collude in order to mask or remove the identification code words. It should also be as difficult as possible for users to collude to alter the identification code word to the effect that one of the other users is falsely indicated as the perpetrator of an offending item of material. Such an attempt by users to collude to either mask the code word or alter the code word to indicate another user is known as a collusion attack.

Any watermarking scheme should be arranged to make it difficult for users receiving copies of the same material to launch a successful collusion attack. A watermarking scheme should therefore with high probability identify a marked material item, which has been the subject of a collusion attack. This is achieved by identifying a code word recovered from the offending material. Conversely, there should be a low probability of not detecting a code word when a code word is present (false negative probability). In addition the probability of falsely detecting a user as guilty of taking part in a collusion attack, when this user has not taken part, should be as low as possible (false positive probability).

U.S. Pat. No. 5,664,018 discloses a watermarking process in which a plurality of copies of material items are marked with a digital watermark formed from a code word having a predetermined number of coefficients. The watermarked material item is for example an image. The apparatus for introducing the watermark transforms the image into the Discrete Cosine Transform (DCT) domain. The digital watermark is formed from a set of randomly distributed coefficients having a normal distribution. In the DCT domain each code word coefficient is added to a corresponding one of the DCT coefficients. The watermarked image is formed by performing an inverse DCT. A related publication entitled "Resistance of Digital Watermarks to Collusion Attacks", by J. Kilian, F. T. Leighton et al, published by MIT, Jul. 27, 1998, provides a detailed mathematical analysis of this watermarking process to prove its resistance to attack.

SUMMARY OF INVENTION

An object of the present invention aims to provide a practical watermarking system, which utilises code words having coefficients which are randomly distributed as proposed as in U.S. Pat. No. 5,664,018.

According to an aspect of the present invention there is provided a detecting data processing apparatus operable to identify at least one of a predetermined set of code words present in a marked version of an original material item. The marked version is formed by combining each of a plurality of samples of the original material item with one of a corresponding plurality of code word coefficients. The detecting apparatus comprises a registering processor operable to associate samples of the original material item with corresponding samples from the marked version of the material item with which corresponding code word coefficients may have been combined. The detecting processor also comprises a recovery processor operable to generate a recovered code word by comparing samples of the original material item with corresponding samples of the marked material version. A correlation processor operable to generate, for each of the code words in the predetermined set of code words, a correlation value by correlating the recovered code word with each of the code words. A detection processor is operable to detect one or more code words from the correlation value for the code word exceeding a predetermined threshold.

According to a second aspect of the invention there is provided an encoding data processing apparatus for generating at least one marked copy of an original item of material by introducing one of a predetermined set of code words into a copy of the original material item. The apparatus comprises a code word generator operable to form the code word from the predetermined set of the code words by generating a plurality of code word coefficients. The apparatus includes an encoding processor operable to combine each of the code word coefficients with one of a corresponding plurality of samples from the original material item to form the marked version of the material item. The code word generator includes a pseudo-random number generator. The code word generator is operable to initialise the pseudo-random number generator in accordance with a seed value uniquely associated with the code word, and to form the code word coefficients from numbers generated by the pseudo-random number generator.

The present invention utilises a pseudo-random number generator forming part of a detecting data processor and an encoding data processor. The random number uses a seed value, which determines the sequence of numbers, produced by the number generator. As such the seed value is uniquely associated with the watermarked copy in which the code word produced from the seed value is present. The seed value therefore provides a convenient facility for identifying the marked copy.

The detection processor according to the present invention is provided with a registration processor. The registration processor provides a further advantage. By registering the marked copy of the material item with respect to the original copy of the material item, the likelihood of detecting the presence of a code word will be improved, reducing the false negative probability. This is because the code word will be more likely to be recovered since the samples of the marked material item will be more likely to correspond with the samples of the original material item.

In preferred embodiments the seed value of the code word is derived from the values of the samples of the original material item. An advantage is thereby provided because it is not necessary to communicate the seed value for each code word between the encoding and the detecting data processing apparatus.

Various further aspects and features of the present invention are defined in the appended claims.

BRIEF DESCRIPTION OF DRAWINGS

Embodiments of the present invention will now be described by way of example only with reference to the accompanying drawings, where like parts are provided with corresponding reference numerals, and in which.

DESCRIPTION OF PREFERRED EMBODIMENTS

Watermarking System Overview

An example embodiment of the present invention will now be described with reference to protecting video images. The number of users to which the video images are to be distributed determines the number of copies. To each copy an identification code word is added which identifies the copy assigned to one of the users.

Video images are one example of material, which can be protected by embedding a digital code word. Other examples of material, which can be protected by embedding a code word, include software programs, digital documents, music, audio signals and any other information-bearing signal.

Figure 1:
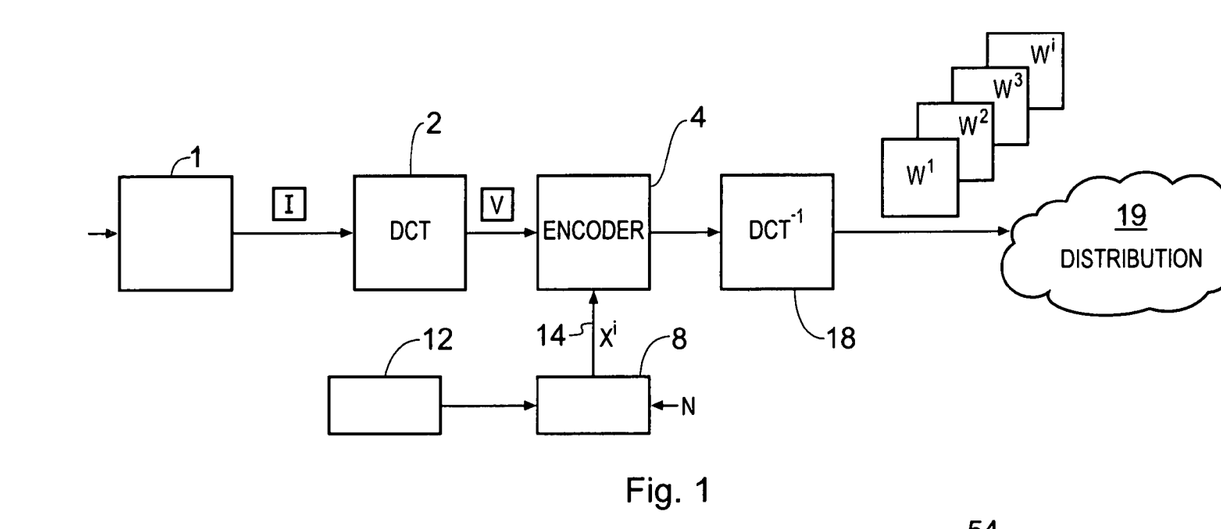
FIG. 1 is a schematic block diagram of an encoding image processing apparatus.

An example of an encoding image processing apparatus, which is arranged to introduce an identification code word into a copy of an original image, is shown in FIG. 1. An original image I is received from a source and stored in a frame store 1. This original image is to be reproduced as a plurality of water marked copies, each of which is marked with a uniquely identifiable code word. The original image is passed to a Discrete Cosine Transform (DCT) processor 2, which divides the image into 8×8 pixel blocks and forms a DCT of each of the 8×8 pixel blocks. The DCT processor 2 therefore forms a DCT transformed image V.

In the following description the term "samples" will be used to refer to discrete samples from which an image (or indeed any other type of material) is comprised. The samples may be luminance samples of the image, which is otherwise, produced from the image pixels. Therefore, where appropriate the terms samples and pixels are interchangeable.

The DCT image V is fed to an encoding processor 4. The encoding processor 4 also receives identification code words from an identification code word generator 8.

The code word generator 8 is provided with a plurality of seeds, each seed being used to generate one of the corresponding code words. Each of the generated code words may be embedded in a copy of the original image to form a watermarked image. The code word generator 8 is provided with a pseudo random number generator. The pseudo random number generator produces the code word coefficients to form a particular code word. In preferred embodiments the coefficients of the code words are generated in accordance with a normal distribution. However, the coefficients of the code word are otherwise predetermined in accordance with the seed, which is used to initialise the random number generator. Thus for each code word there is a corresponding seed which is stored in a data store 12. Therefore it will be understood that to generate the code word $X^i$, $seed_i$ is retrieved from memory 12 and used to initialise the random number generator within the code word generator 8.

In the following description the DCT version of the original image is represented as V, where;

$$V = \{v_i\} = \{v_1, v_2, v_3, v_4, \ldots v_N\}$$

and $v_i$ are the DCT coefficients of the image. In other embodiments the samples of the image $v_i$ could represent samples of the image in the spatial domain or in an alternative domain.

Each of the code words $X^i$ comprises a plurality of n code word coefficients, where;

$$X^i = \{x_j^i\} = \{x_1^i, x_2^i, x_3^i, x_4^i, \ldots x_n^i\}$$

The number of code word coefficients n corresponds to the number or samples of the original image V. However, a different number of coefficients is possible, and will be determined in dependence upon a particular application.

A vector of code word coefficients $X^i$ forming the i-th code word is then passed via channel 14 to the encoder 4. The encoder 4 is arranged to form a watermarked image $W_i$ by adding the code word $X^i$ to the image V. Effectively, therefore, as represented in the equation below, each of the code word coefficients is added to a different one of the coefficients of the image to form the watermark image $W_i$.

$$W^i = V + X^i$$

$$W^i = v_1 + x_1^i, v_2 + x_2^i, v_3 + x_3^i, v_4 + x_4^i, \ldots, v_n + x_n^i$$

As shown in FIG. 1, the watermarked images $W_i$ are formed at the output of the image processing apparatus by forming inverse DCT of the image produced at the output of the encoding processor 4 by the inverse DCT processor 18.

Therefore as represented in FIG. 1 at the output of the encoder 4 a set of the watermarked images can be produced. For a data word of up to 20-bits, one of 10 000 000 code words can be selected to generate 10 million watermarked $W_j$ versions of the original image I.

Although the code word provides the facility for uniquely identifying a marked copy $W_i$ of the image I, in other embodiments the 20 bits can provide a facility for communicating data within the image. As will be appreciated therefore, the 20 bits used to select the identification code word can provide a 20 bit pay-load for communicating data within the image V.

The encoding image processing apparatus which is arranged to produce the watermarked images shown in FIG. 1 may be incorporated into a variety of products for different scenarios in which embodiments of the present invention find application. For example, the encoding image processing apparatus may be connected to a web site or web server from which the watermarked images may be downloaded. Before downloading a copy of the image, a unique code word is introduced into the downloaded image, which can be used to detect the recipient of the downloaded image at some later point in time.

In another application the encoding image processor forms part of a digital cinema projector in which the identification code word is added during projection of the image at, for example, a cinema. Thus, the code word is arranged to identify the projector and the cinema at which the images are being reproduced. Accordingly, the identification code word can be identified within a pirate copy produced from the images projected by the cinema projector in order to identify the projector and the cinema from which pirate copies were produced. Correspondingly, a watermarked image may be reproduced as a photograph or printout in which a reproduction or copy may be made and distributed. Generally therefore, the distribution of the watermarked images produced by the encoding image processing apparatus shown in FIG. 1 is represented by a distribution cloud 19.

Detecting Processor

Figure 2:
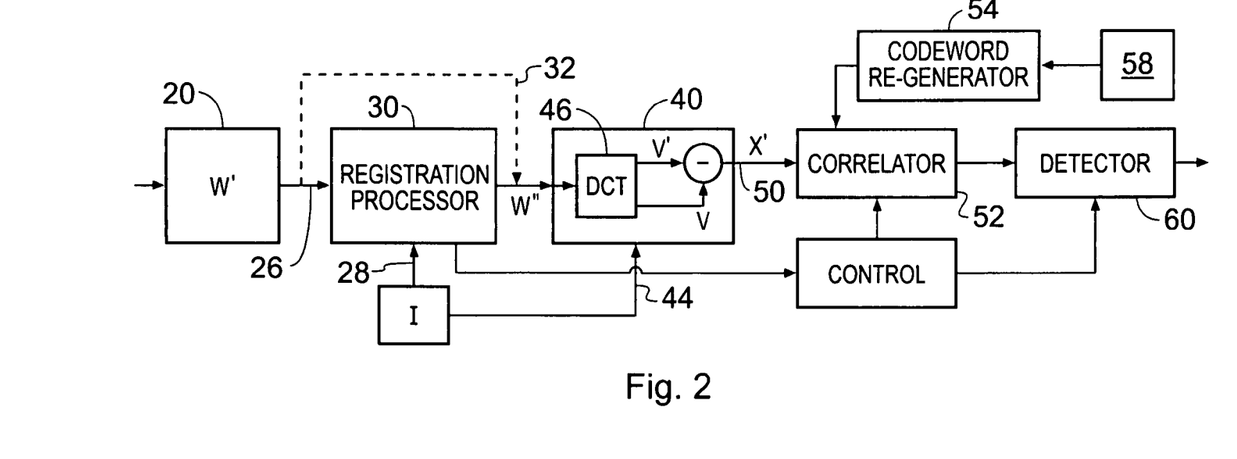
FIG. 2 is a schematic block diagram of a detecting image processing apparatus.

A detecting image processing apparatus which is arranged to detect one or more of the code words, which may be present in an offending marked image is shown in FIG. 2. Generally, the image processor shown in FIG. 2 operates to identify one or more of the code words, which may be present in an offending, copy of the image.

The offending version of the watermarked image W' is received from a source and stored in a frame store 20. Also stored in the frame store 20 is the original version of the image I, since the detection process performed by the image processor requires the original version of the image. The offending watermarked image W' and the original version of the image are then fed via respective connecting channels 26, 28 to a registration processor 30.

As already explained, the offending version of the W' may have been produced by photographing or otherwise reproducing a part of the watermarked image W'. As such, in order to improve the likelihood of detecting the identification code word, the registration processor 30 is arranged to substantially align the offending image with the original version of the image present in the data store 20. The purpose of this alignment is to provide a correspondence between the original image samples I and the corresponding samples of the watermarked image W' to which the code word coefficients have been added.

Figures 3, 3A, 3B, 3C:
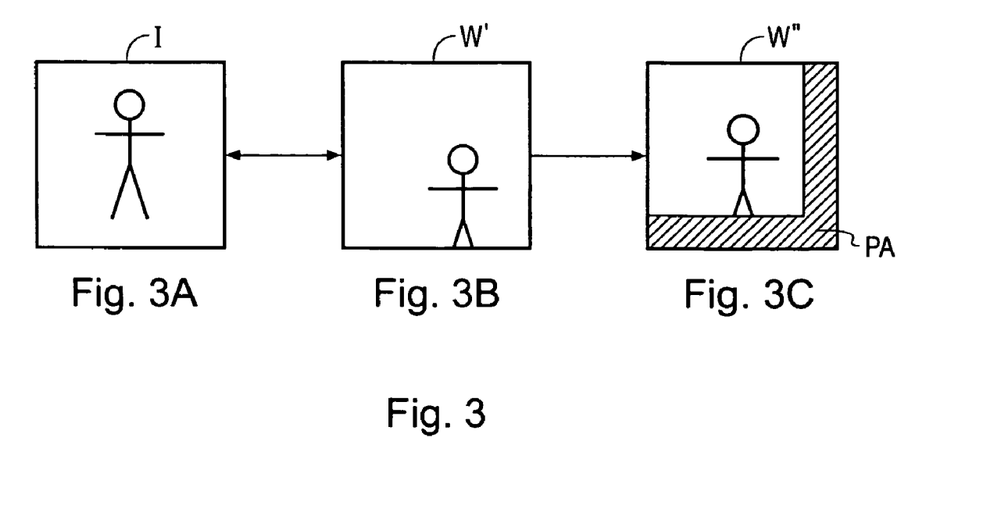
FIG. 3A is a representation of an original image.
FIG. 3B is a representation of a marked image and FIG. 3C is the marked image after registration.

The effects of the registration are illustrated in FIG. 3. In FIG. 3 an example of the original image I is shown with respect to an offending marked version of the image W'. As illustrated in FIG. 3, the watermarked image W' is offset with respect to the original image I and this may be due to the relative aspect view of the camera from which the offending version of the watermarked image was produced.

In order to recover a representation of the code word coefficients, the correct samples of the original image should be subtracted from the corresponding samples of the marked offending image. To this end, the two images are aligned. As shown in FIG. 3, the registered image W'' has a peripheral area PA which includes parts which were not present in the original image.

As will be appreciated in other embodiments, the registration processor 30 may not be used because the offending image W' may be already substantially aligned to the originally version of the image I, such as, for example, if the offending version was downloaded via the Internet. Accordingly, the detecting image processor is provided with an alternative channel 32, which communicates the marked image directly to the recovery processor 40.

The registered image W'' is received by a recovery processor 40. The recovery processor 40 also receives a copy of the original image I via a second channel 44. The registered image W'' and the original image I are transformed by a DCT transform processor 46 into the DCT domain. An estimated code word X' is then formed by subtracting the samples of the DCT domain marked image V' from the DCT domain samples of the original image V as expressed by the following equations:

$$X' = V' - V$$

$$= v'_1 - v_1, v'_2 - v_2, v'_3 - v_3, v'_4 - v_4, \ldots, v'_n - v_n,$$

$$= x'_1, x'_2, x'_3, x'_4, \ldots x'_n$$

The output of the recovery processor 40 therefore provides on a connecting channel 50 an estimate of the coefficients of the code word which is to be identified. The recovered code word X' is then fed to a first input of a correlator 52. The correlator 52 also receives on a second input the regenerated code words $X^i$ produced by the code word generator 54. The code word generator 54 operates in the same way as the code word generator 8 which produces all possible code words of the set, using the predetermined seeds which identify uniquely the code words from a store 58.

The correlator 52 forms n similarity sim(i) values. In one embodiment, the similarity value is produced by forming a correlation in accordance with following equation:

$$sim(i) = \frac{X^i \cdot X'}{\sqrt{X^i \cdot X'}} = \frac{x_1^i \cdot x'_1 + x_2^i \cdot x'_2 + x_3^i \cdot x'_3 + \ldots + x_n^i \cdot x'_n}{\sqrt{x_1^i \cdot x'_1 + x_2^i \cdot x'_2 + x_3^i \cdot x'_3 + \ldots + x_n^i \cdot x'}}$$

Figure 4:
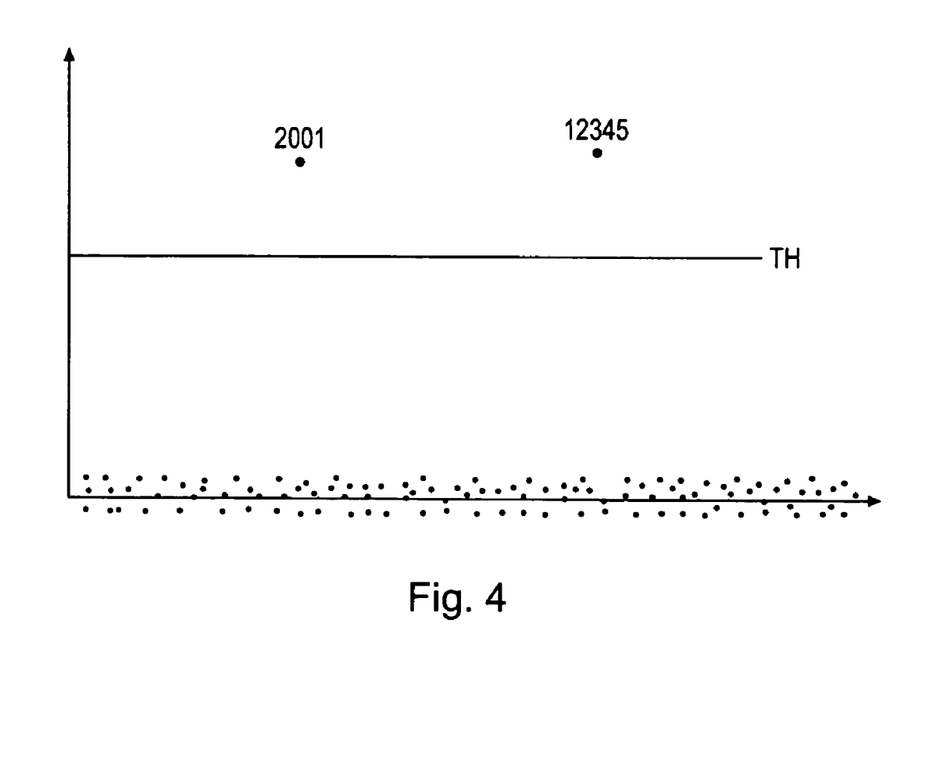
FIG. 4 is a graphical representation of an example correlation result for each of a set of N code words.

Each of the n similarity values sim(i) is then fed to a detector 60. The detector 60 then analyses the similarity values sim(i) produced for each of the n possible code words. As an example, the similarity values produced by the correlator 52 are shown in FIG. 4 with respect to a threshold TH for each of the possible code words. As shown in FIG. 4, two code words are above the threshold, 2001, 12345. As such, the detecting processor concludes that the watermarked version associated with code word 2001 and code word 12345 must have colluded in order to form the offending image. Therefore, in accordance with a false positive detection probability, determined from the population size, which in this case is 10 million and the watermarking strength α, the height of the threshold TH can be set in order to guarantee the false detection probability. As in the example in FIG. 4, if the similarity values produced by the correlator 52 exceed the threshold then, with this false positive probability, the recipients of the marked image are considered to have colluded to form the offending watermarked version of the image $W^i$.

The following sections provide illustrations of advantages and features of the operation of the watermarking system illustrated in FIGS. 1 and 2.

Registration

The process of aligning the offending marked version of the image with the copy of the original image comprises correlating the samples of the original image with respect to the marked image. The correlation is performed for different shifts of the respective samples of the images. This is illustrated in FIG. 5.

Figure 5A:
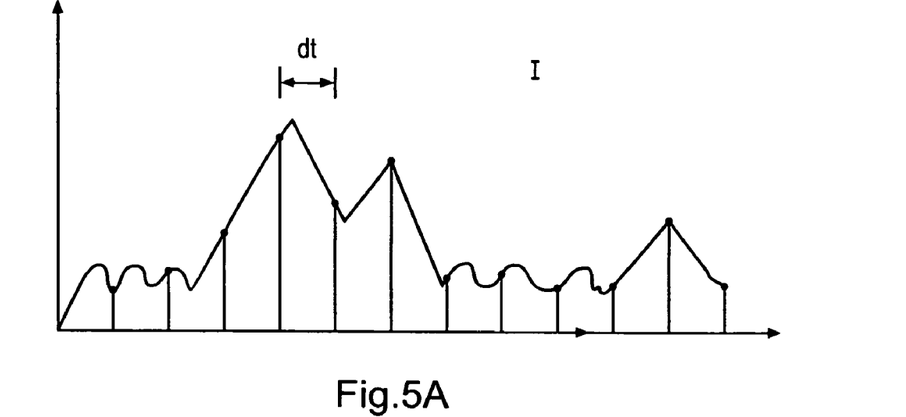
FIG. 5A is a graphical representation of samples of the original image I.
Figure 5B:
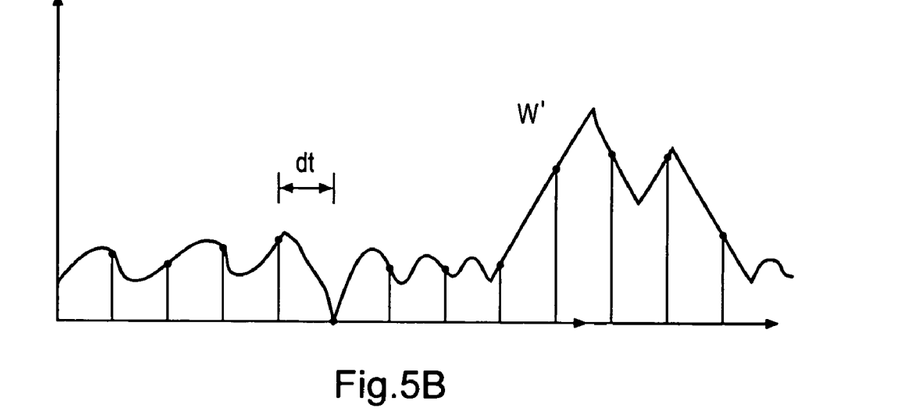
FIG. 5B is a graphical representation of samples of the watermarked image W'.

FIG. 5A provides an illustration of discrete samples of the original image I, whereas FIG. 5B provides an illustration of discrete samples of the offending watermarked image W'. As illustrated in the FIGS. 5A and 5B, the sampling rate provides a temporal difference between samples of dt. A result of shifting each of the sets of samples from the images and correlating the discrete samples is illustrated in FIG. 5C.

Figure 5C:
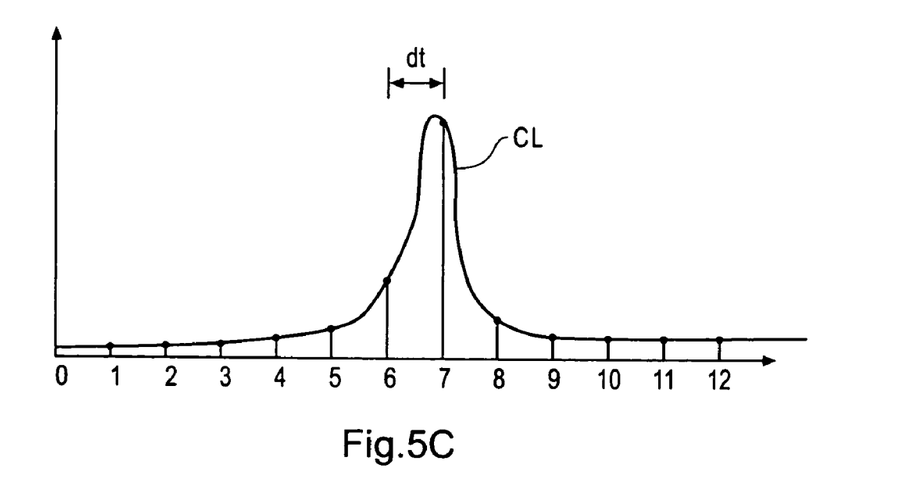
FIG. 5C is a graphical representation of correlation results for the original image and the watermarked image with respect to discrete sample shifts.

As shown in FIG. 5C, for a shift of between 6 and 7 samples, the correlation peak is highest. However, as illustrated by the continuous line CL formed between the samples, the actual peak shift of the original image with respect to the offending watermarked image, falls between 6 and 7 samples.

Figure 6A:
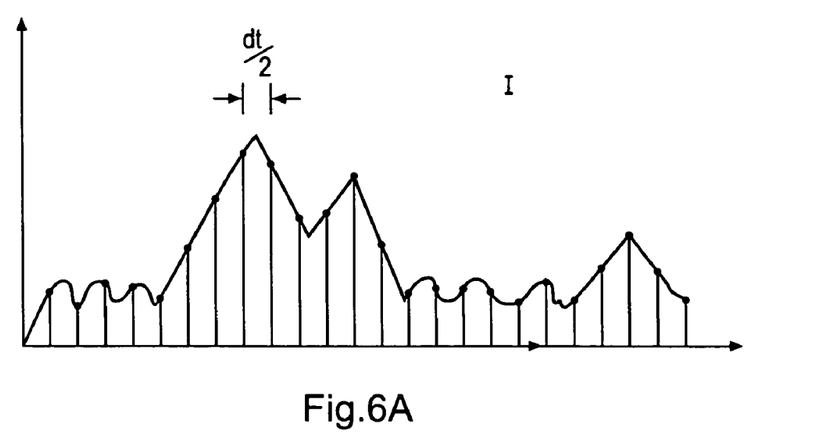
FIG. 6A is a graphical representation of an over-sampled version of the original image I.
Figure 6B:
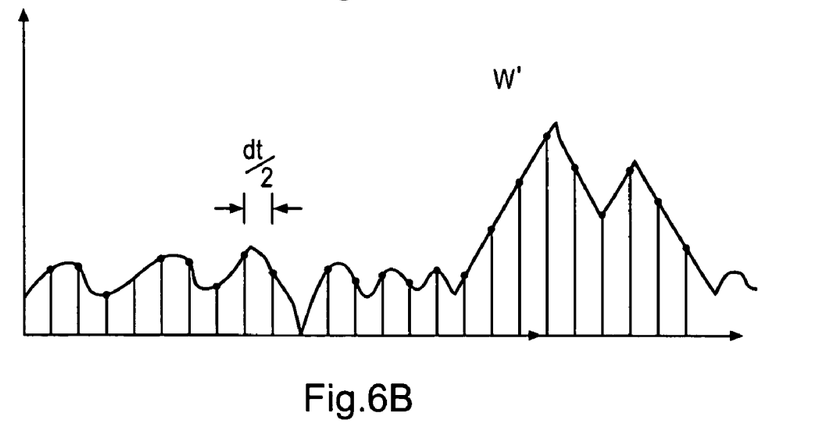
FIG. 6B is a graphical representation of an over-sampled version of the watermarked image W'.
Figure 6C:
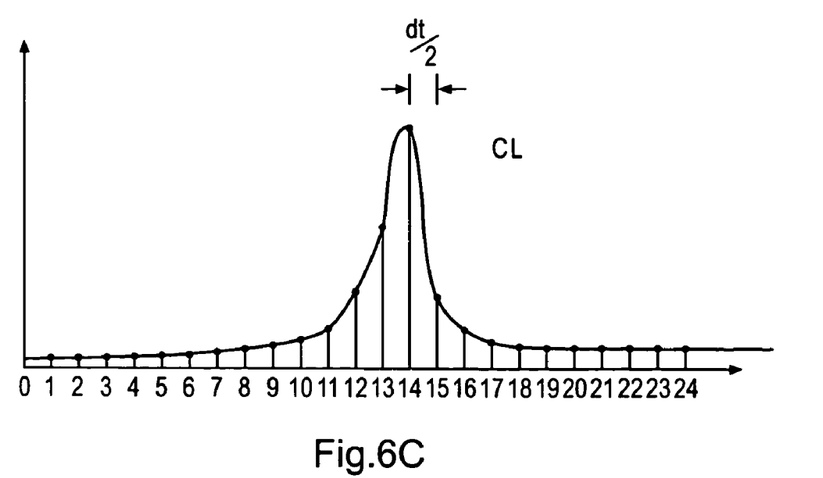
FIG. 6C is a graphical representation of correlation results for the over-sampled original image and the watermarked image with respect to discrete sample shifts.

In preferred embodiments, the registration processor is operable, following the detection of a first registration position, to detect a second registration position, which is refined with respect to first registration position. To this end, the registration processor 30 operates as illustrated in FIG. 6. FIGS. 6A and 6B show the original image I and the watermarked offending image W', but over sampled to twice the sampling rate. Correspondingly, therefore, the difference between successive samples is dt/2. As can be seen in FIG. 6C, the peak value of the correlation between the over-sampled versions of the original image and the offending watermarked image falls at 12 samples, which corresponds to an approximate position of the peak of the correlation output. It will therefore be appreciated that the registration processor 30 is able to provide a more accurate registration of the two images by performing the second registration process for the over-sampled version of the original and marked images.

Figure 7:
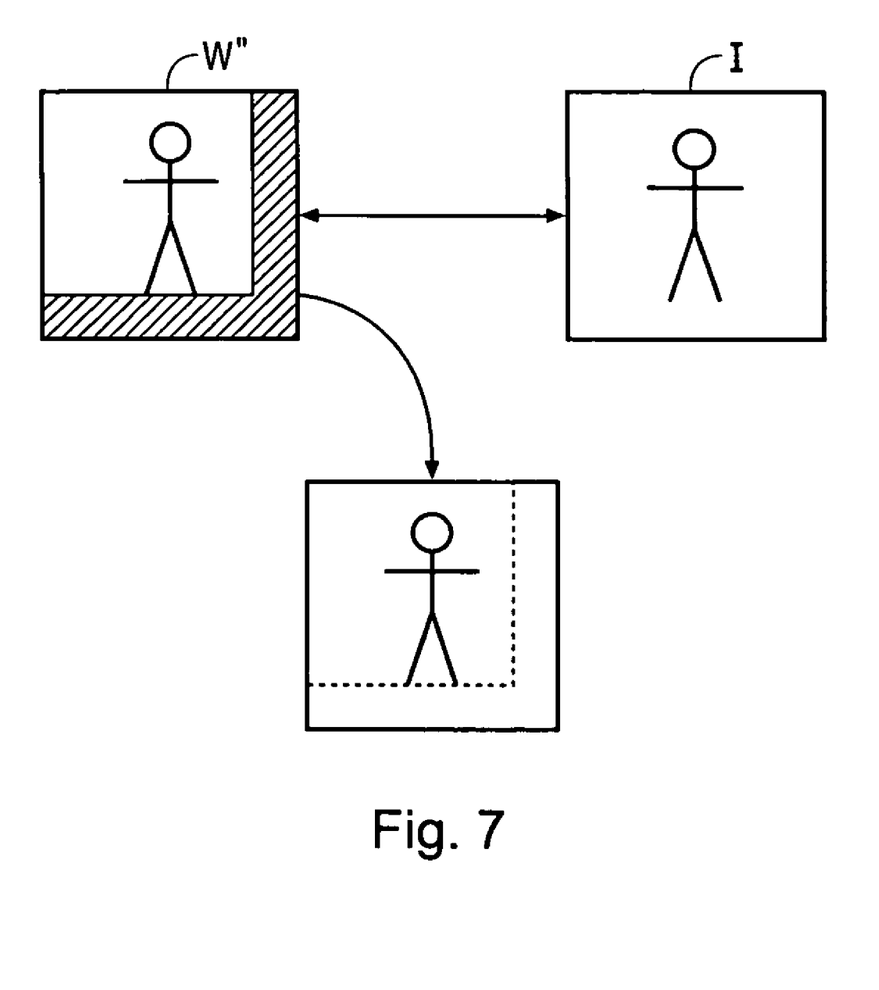
FIG. 7 is a representation illustrating pre-processing of the registered marked image with the effect of replacing parts of the marked image not present in the original image with corresponding parts of the original image.

A further advantage provided by the registration processor shown in FIG. 2 is illustrated in FIG. 7. In FIG. 7 the registered image W'', which has been reproduced from FIG. 3, is shown with respect to the original image I. In order to improve the likelihood of detecting the code word within the offending watermarked image W'', the parts of the original image not present in the watermarked image, shown as the peripheral area PA are replaced by corresponding parts of the original image. This is effected by comparing the mean absolute difference between the samples of the original image and the offending watermarked image and if this difference exceeds a predetermined threshold, then the samples of the offending watermarked image are simply replaced by corresponding samples from the original image. This provides a particular advantage in the detection process formed by the correlator 52 in combination with the detector 60. This is because, if the parts of the marked image PA, which were not present in the original image, are used to form recovered code word coefficients these coefficients will not correlate with the reproduced version of the code word. These coefficients can produce large values, causing significant noise in the correlation sum sim(i). As such, there will be a reduced likelihood of the correctly identified code word being above the threshold TH for detecting code words in the detector 60. Replacing the parts of the offending image with the corresponding parts from the original image, therefore reduces the likelihood of a false negative detection, by effectively setting the corresponding correlation terms to zero.

Code Word Generation

A further advantageous aspect of the embodiment shown in FIGS. 1 and 2 is provided by generating the seed of the random number from which the code word is produced from the source image samples. This is affected by analysing the DCT coefficients of the image to be watermarked and from these coefficients, generating the seed to be used to generate the code word. This can be effected, for example, by using a hashing algorithm known to those skilled in the art as "secure hashing algorithm 1" (sha-1). This algorithm forms an ANSI standard (ANSIx9.30-2). This algorithm is referred to in a book entitled "Handbook of applied cryptography" by A. J. Menezes. As such the seed from the random number can be generated and determined in the encoding image processor and the detecting image processor from the DCT coefficients.

Other Applications

In addition to the above-mentioned applications of the encoding data processing apparatus of the watermarking system to a cinema projector and to a web server, other applications are envisaged. For example, a receiver/decoder is envisaged in which received signals are watermarked by introducing code words upon receipt of the signals from a communicating device. For example, a set top box is typically arranged to receive television and video signals from a "head-end" broadcast or multi-cast device. As will be appreciated in this application, the encoding data processing apparatus forms part of the set top box and is arranged to introduce watermark code words into the video signals as the signals are received and decoded. In one example embodiment, the watermark code word is arranged to uniquely identify the set top box which receives and decodes the video signals.

In a further embodiment a digital cinema receiver is arranged to receive a digital cinema film via a satellite. The receiver is arranged to receive signals representing the digital cinema film and to decode the signals for reproduction. The receiver includes an encoding data processing apparatus, which introduces a watermark code word into the decoded film signals. The watermark code word is provided, for example, to uniquely identify the cinema receiving the film signals.

A further example embodiment may comprise a digital camera or camcorder or the like which includes a memory and a memory controller. An encoding data processing apparatus according to an embodiment of the present invention is arranged to introduce a watermark code word stored in the memory into video signals captured by the camera. According to this embodiment, the encoding data processing apparatus does not include a code word generator because the code word is pre-stored in the memory. Under the control of the memory controller the code word stored in the memory is embedded into the video signals, uniquely or quasi-uniquely identifying the video signals.

In a further embodiment, an encoding data processing apparatus according to an embodiment of the invention is operable to encode a sequence of watermark code words into different frames of digital images forming a continuous or moving picture. The code words may be related to one another and may be used to identify each of the images separately.

Various further aspects and features of the present invention are defined in the appended claims. Various modifications can be made to the embodiments herein before described without departing from the scope of the present invention.

The invention claimed is:

1. A detecting data processing apparatus operable to identify one or more of a predetermined set of code words present in a marked version of an original material item, said marked version having been formed by combining a plurality of samples of said original material item with one of a corresponding plurality of code word coefficients, said apparatus comprising:
   a registering processor operable to associate samples of said original material item with corresponding samples from said marked version of said material item with which corresponding code word coefficients may have been combined,
   a recovery processor operable to generate a recovered code word by comparing samples of said original material item with corresponding samples of said marked material version,
   a correlation processor operable to generate, for each of said code words in said predetermined set of code words a correlation value by correlating the recovered code word with each of the generated code words, and
   a detection processor operable to detect said one or more code words from the corresponding correlation value for the code word exceeding a predetermined threshold,
   wherein said registering processor is operable
   to form a representation of a correlation of the samples of said original material item and the samples of said marked version, for each of a plurality of respective shifts of said original material item with respect to said marked version of said material item, and
   to determine a first registration position of said original material item with respect to said marked material item, from the respective shift producing the highest correlation value, wherein said registering processor is operable
   to over sample said original material item and said marked version of said material item,
   to form said representation of the correlation of the over sampled versions of said original material item and said marked version, for a plurality of respective shifts with respect to said first registration position, and
   to determine a second registration position from the respective shift of said over-sampled versions having the highest correlation value.

2. The detecting data processing apparatus as claimed in claim 1, wherein said registration processor is operable
   to calculate a difference between each sample of said original material item and the corresponding sample of said marked copy of said material item with respect to said second registered position,
   to compare the difference with a pre-determined threshold and if said difference is greater than said threshold, to replace said samples of said registered marked material item with said samples of said original material item.

3. The detecting data processing apparatus as claimed in claim 1, wherein said correlation processor includes a code word generator operable to generate pseudo-random numbers from which regenerated code word coefficients are formed, said pseudo-random numbers being generated from a seed value, said seed value being formed from the samples of said original material item.

4. The detecting data processing apparatus as claimed in claim 1, wherein said code word has been introduced into said material item in the discrete cosine transform domain, said apparatus comprising:
   a discrete cosine transform processor operable to transform said marked material item and said original material item into the discrete cosine transform domain, wherein said recovery processor is operable to generate said recovered code word by subtracting corresponding discrete cosine transform coefficients of said original material version from discrete cosine transform coefficients of said marked material version.

5. A computer program of a computer readable medium providing computer executable instructions, which when loaded onto a data processor configures the data processor to operate as the detecting data processing apparatus according to claim 1.

6. An encoding data processing apparatus for generating at least one marked version of an original item of material by introducing one of a predetermined set of code words into a copy of said original material item, the predetermined set of code words including a plurality of code words having a predetermined number N, said apparatus comprising:
   a code word generator operable to form said code word from said predetermined set of said code words having a plurality of code word coefficients, and
   an encoding processor operable to combine each of the code word coefficients with one of a corresponding plurality of samples from said original material item to form said marked version of said material item, wherein
   said code word is generated using a pseudo-random number generator initialized with a seed value uniquely associated with said code word, said code word coefficients being formed from numbers generated by said pseudo-random number generator, and each code word in the predetermined set of code words is uniquely defined by a corresponding seed value which represents pay load data.

7. The encoding data processor as claimed in claim 6, comprising a code word generator operable to generate said seed value from the samples of said material item.

8. The encoding data processing apparatus as claimed in claim 6, comprising:
   A discrete cosine transform processor operable to transform said material item into the discrete cosine transform domain, said material item in said discrete cosine transform domain being represented as a plurality of discrete cosine transform coefficients, wherein said encoding processor is operable to combine said code word with said material item by adding each of said code word coefficients to a corresponding one of said discrete cosine transform coefficients, and
   an inverse discrete cosine transform processor operable to form said marked copy of said material item by performing an inverse discrete cosine transform on said discrete cosine transform image to which said code word has been added by said encoding processor.

9. A cinema projector including an encoding data processing apparatus according to claim 6, wherein said data processing apparatus is operable to receive at least one of audio signals and image signals before reproduction, and to introduce a code word into said at least one of audio signals and image signals before reproduction.

10. A web server operable to provide material items for downloading via the Internet, said web server including an encoding data processing apparatus according to claim 6, wherein said data processing apparatus is operable to receive material items and to introduce a code word into said material items before said material items are downloaded.

11. A computer program of a computer readable medium providing computer executable instructions, which when loaded onto a data processor configures the data processor to operate as the encoding data processor according to claim 6.

12. A receiver operable to receive signals representative of material items, comprising:
  an encoding data processing apparatus according to claim 6, operable to combine at last one code word with the received signals, said code word being provided to identify uniquely said received signals.

13. A method of identifying one or more of a predetermined set of code words present in a marked version of an original material item, said marked version having been formed by combining each of a plurality of samples of a copy of said original material item with one of a corresponding plurality of code word coefficients, said method comprising:
  associating samples of said original material items with corresponding samples from said marked version of said material item with which corresponding code word coefficients may have been combined,
  generating a recovered code word by subtracting corresponding samples of said original material item from said samples of said marked material item,
  generating, for each of said plurality of code words, a correlation value by correlating the recovered code word with each of the plurality of code words, and
  detecting said at least one code word from the correlation value for the code word exceeding a predetermined threshold,
  forming a representation of a correlation of the samples of said original material item and the samples of said marked version, for each of a plurality of respective shifts of said original material item with respect to said marked version of said material item, and
  determining a first registration position of said original material item with respect to said marked material item, from the respective shift producing the highest correlation value,
  over sampling said original material item and said marked version of said material item,
  forming said representation of the correlation of the over sampled versions of said original material item and said marked version, for a plurality of respective shifts with respect to said first registration position, and
  determining a second registration position from the respective shift of said over-sampled versions having the highest correlation value.

14. A method of generating at least one marked version of an original item of material by introducing one of a predetermined set of code words into a copy of said original material item, the predetermined set of code words including a plurality of code words having a predetermined number N, said method comprising:
  forming said code word from said predetermined set of said code words from a plurality of code word coefficients, and
  combining each of the code word coefficients with a different one of a corresponding plurality of samples from said original material item, to form said marked material item, wherein said forming said code word comprises
  initializing a pseudo-random number generator in accordance with a seed value uniquely associated with said code word, and
  forming said code word coefficients from numbers generated by said pseudo-random number generator, wherein each code word in the predetermined set of code words is uniquely defined by a corresponding seed value which represents pay load data.

15. A computer program of a computer readable medium providing computer executable instructions, which when loaded on to a data processor causes the data processor to perform the method according to claim 14.

16. A detecting data processing apparatus for identifying one or more of a predetermined set of code words present in a marked version of an original material items, said marked version having been formed by combining each of a plurality of samples of said original material item with one of a corresponding plurality of code word coefficients, said apparatus comprising:
  associating means for associating samples of said version of said material item with corresponding samples from said original material items to which corresponding code word coefficients may have been added,
  means for generating a recovered code word by subtracting corresponding samples of said original material item from said samples of said marked material item,
  means for generating, for each of said plurality of code words, a correlation value by correlating the recovered code word with each of the plurality of code words, and
  means for detecting said at least one code word from the correlation value for the code word exceeding a predetermined threshold,
  wherein said associating means is operable,
  to form a representation of a correlation of the samples of said original material item and the samples of said marked version, for each of a plurality of respective shifts of said original material item with respect to said marked version of said material item, and
  to determine a first registration position of aid original material items with respect to said marked material item, from the respective shift producing the highest correlation value, wherein said registering processor is operable,
  to over sample said original material item and said marked version of said material item,
  to form said representation of the correlation of the over sampled versions of said original material item and said marked version, for a plurality of respective shifts with respect to said first registration position, and
  to determine a second registration position from the respective shift or said over-sampled versions having the highest correlation value.

17. An encoding data processing apparatus for generating at least one marked version of an original item of material by introducing one of a predetermined set of code words into a copy of said original material item, the predetermined set of code words including a plurality of code words having a predetermined number N, said apparatus comprising:
 means for forming said code word from said predetermined set of said code words from a plurality of code word coefficients, and
 means for combining each of the code word coefficients with a different one of a corresponding plurality of samples from said original material item, to form said marked material item, wherein said means for forming said code word comprises
 means for initializing a pseudo-random number generator in accordance with a seed value uniquely associated with said code word, and
 means for forming said code word coefficients from numbers generated by said pseudo-random number generator, wherein each code word in the predetermined set of code words is uniquely defined by a corresponding seed value which represents pay load data.

18. A system, including an encoding data processing apparatus and a detecting data for identifying a recipient of a material item, the encoding data processing apparatus comprising:
 a code word generator operable to form said code word from said predetermined set of said code words having a plurality of code word coefficients, and
 an encoding processor operable to combine each of the code word coefficients with one of a corresponding plurality of samples from said original material item to form said marked version of said material item, wherein
 said code word is generated using a pseudo-random number generator initialized with a seed value uniquely associated with said code word, said code word coefficients being formed from numbers generated by said pseudo-random number generator,
 wherein the encoding data processing apparatus is operable to generate said marked material item by introducing a code word generated from a seed uniquely identifying said recipient, and
the detecting data processing apparatus including:
 a registering processor operable to associate samples of said original material item with corresponding samples from said marked version of said material item with which corresponding code word coefficients may have been combined,
 a recovery processor operable to generate a recovered code word by comparing samples of said original material item with corresponding samples of said marked material version,
 a correlation processor operable to generate, for each of said code words in said predetermined set of code words a correlation value by correlating the recovered code word with each of the generated code words, and
 a detection processor operable to detect said one or more code words from the corresponding correlation value for the code word exceeding a predetermined threshold,
 wherein said registering processor is operable,
 to form a representation of a correlation of the samples of said original material item and the samples of said marked version, for each of a plurality of respective shifts of said original material item with respect to said marked version of said material item, and
 to determine a first registration position of said original material item with respect to said marked material item, from the respective shift producing the highest correlation value, wherein said registering processor is operable
 to over sample said original material item and said marked version of said material item,
 to form said representation of the correlation of the over sampled versions of said original material item and said marked version, for a plurality of respective shifts with respect to said first registration position, and
 to determine a second registration position from the respective shift of said over-sampled versions having the highest correlation value,
 wherein the detecting data processing apparatus is operable to detect with a predetermined false positive probability the recipient by detecting the presence or absence of the code word in said material.

* * * * *